Nov. 8, 1949 A. D. FERGUSON 2,487,120
CONTROL VALVE, VIBRATION DAMPENER, AND EXPANSION
JOINT DEVICE FOR A COMPRESSOR DISCHARGE LINE
Filed Nov. 14, 1944 2 Sheets-Sheet 2

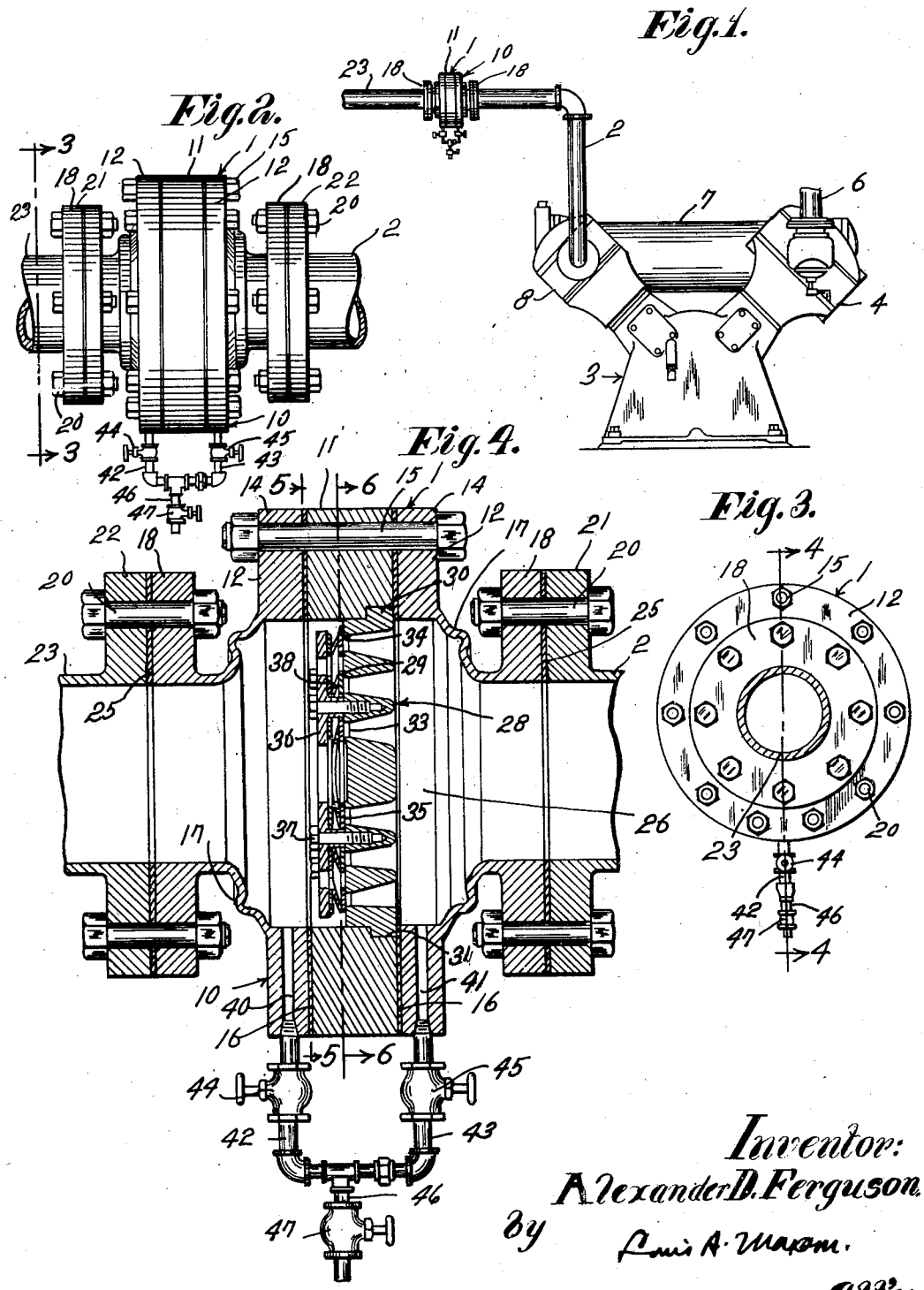

Inventor:
Alexander D. Ferguson,
by
Louis A. Maxson.
Att'y

Patented Nov. 8, 1949

2,487,120

UNITED STATES PATENT OFFICE 2,487,120

CONTROL VALVE, VIBRATION DAMPENER, AND EXPANSION JOINT DEVICE FOR A COMPRESSOR DISCHARGE LINE

Alexander D. Ferguson, Michigan City, Ind., assignor to Joy Manufacturing Company, a corporation of Pennsylvania Application November 14, 1944, Serial No. 563,425

5 Claims. (Cl. 137—78)

1

My invention relates to control devices adapted for use with a conduit through which compressed fluid flows, and more particularly to a device for removing the pulsations in a stream of compressed fluid, for permitting a variation in length of the fluid conductors, for preventing a backflow of fluid, and for removing any liquid carried with the fluid.

When air is discharged into a conduit by a compressor there will be, especially where the conduit is long, pulsations in the air stream which may cause considerable vibration in the connected system. There should be in the discharge conduit as close as possible to the compressor outlet some means for removing the pulsations. The air taken into the compressor will carry some moisture with it, and the air will pick up in the compressor during compression small amounts of oil. It is desirable that this moisture and oil be removed from the compressed air. The heating of the discharge conduit by the compressed air will cause it to expand, and it is necessary that some provision be made for such expansion. When the compressor discharges into a system in which a pressure is to be maintained when the compressor is shut down, it is necessary that valve means be provided for preventing a backflow of fluid.

My invention contemplates the provision of means which gives the desired control of each of the above conditions. In a preferred form of my invention, a chamber providing device having extensible walls is connected in a compressor discharge conduit close to the outlet of a compressor. The chamber is somewhat larger in cross-sectional area than the discharge conduit, and is of sufficient volume to absorb to some extent the pulsations in the fluid stream. The extensible walls of the chamber are so arranged as to permit the changes in length of the discharge conduit caused by temperature variations, and these walls also act to absorb a portion of the pulsations. Arranged within the chamber is a valve mechanism which breaks up the fluid stream and passes the fluid in a plurality of streams from one portion of the chamber to another. This valve mechanism operates to prevent any backflow of the fluid in the conduit when the compressor is shut down, and the valves for the mechanism, by reason of their number and design, are adapted to provide a quick opening and closing of the flow passages. The breaking up of the main fluid stream causes further reductions in the pulsations as well as a separation of oil and water from the air. At the bottom of the chamber are valve controlled passage means for draining off the separated oil and water.

An object of my invention is to provide an improved control device adapted for use with a conduit through which a compressed fluid flows. Another object is to provide an improved device for removing the pulsations in a stream of compressed fluid. Still another object is to provide an improved device which is operative to provide for the changes in length of a fluid conducting conduit and to remove the pulsations in a compressed fluid carried by the conduit. Another object is to provide an improved device for removing the pulsations in a stream of compressed fluid and preventing a backflow of fluid. Yet another object is to provide an improved device for removing pulsations in a stream of compressed fluid, preventing a backflow of fluid, and separating liquid from the fluid stream. Still another object is to provide in a fluid-treating and flow-control device, an enlarged expansible chamber providing member containing a check valve mechanism through which a stream of compressed fluid is discharged, and having means for removing liquid separated from the fluid. Other objects will appear in the course of the following decription.

There is shown in the drawings one illustrative embodiment which my invention may assume in practice.

In these drawings:

Fig. 1 is a front elevational view of a compressor discharging through my improved control device.

Fig. 2 is an enlarged front elevational view of my control device.

Fig. 3 is an end elevational view of the control device taken on the plane of the line 3—3 of Fig. 2.

Fig. 4 is an enlarged longitudinal sectional view taken on the plane of the line 4—4 of Fig. 3.

Figure 5:
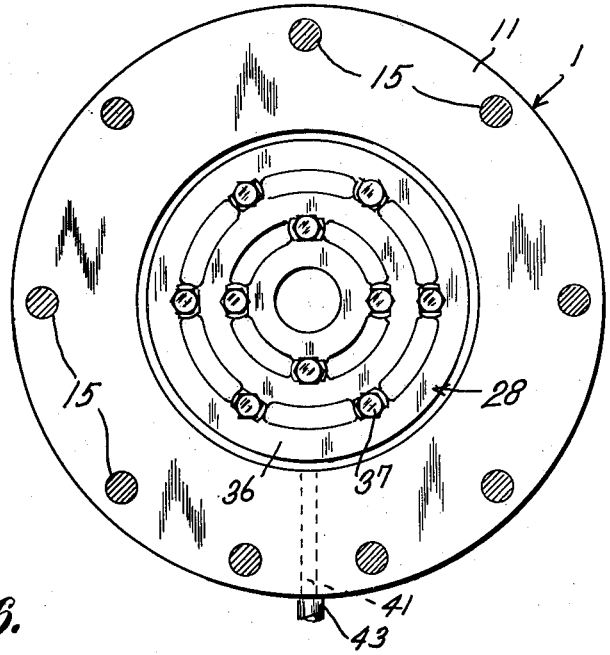
Fig. 5 is a view taken on the plane of the line 5—5 of Fig. 4.
Figure 6:
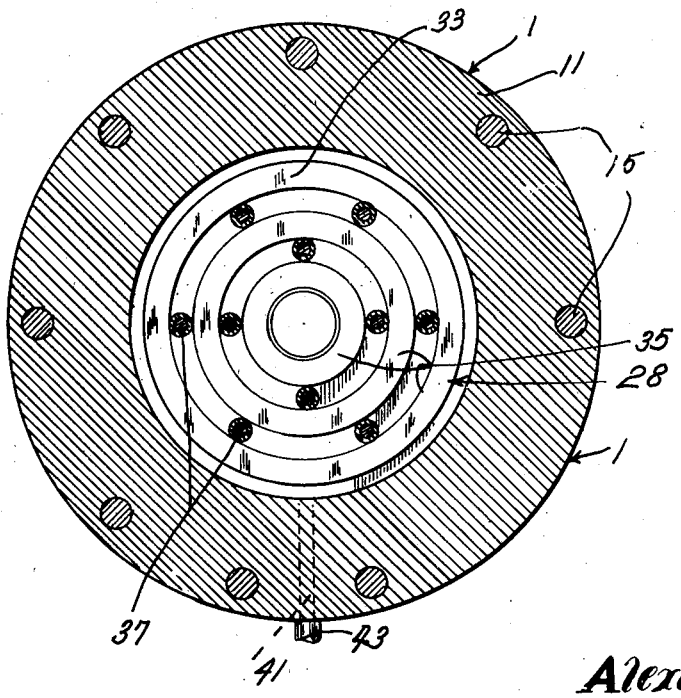
Fig. 6 is a cross-sectional view taken on the plane of the line 6—6 of Fig. 3.

In the illustrative embodiment of the invention my improved control device 1 is shown connected in the discharge line 2 of a compressor generally designated 3. The compressor is shown herein as being of the two stage V-type and has a low pressure cylinder 4 in which air, taken in from an intake conduit 6, is compressed and then discharged through an inter-cooler 7 to a high pressure cylinder 8 where the air is compressed further and then discharged to the line 2. It will be understood that the compressor may have only a single stage of compression, if desired, and be of any type.

The control device 1 includes a casing, generally designated 10, made up of an annular member 11 and end closure members 12 having annular flange portions 14 clamped, as by bolts 15, to opposite sides of the member 11. Arranged between the flange portions 14 and the member 11 are packing rings 16 which provide an airtight fit. Each closure member 12 also has an extensible wall portion 17 shown herein as being formed integral with the flange portion 14 and with another annular flange portion 18. The wall portion 17 could, if desired, be welded or clamped in any suitable manner to the flange portions 14 and 18. The flange portions 18 are attached, as by bolts 20, to flange portions 21 and 22 formed, respectively, on the discharge line 2 and on a fluid delivery conduit 23. Packing rings 25 arranged between the flange portions 18 and the flange portions 21 and 22 provide a fluid-tight fit. The annular member 11 and the end closure members 12 cooperate to provide a chamber 26 which communicates at its opposite ends through the annular flange portions 18 with the discharge line 2 and with the fluid delivery conduit 23.

Arranged within the chamber 26 is a valve mechanism, generally designated 28, including a valve plate 29 having an annular flange portion 30 which fits in an annular groove 31 formed in the inner wall of the member 11. Opening through the valve plate are concentric annular ports 33, and formed on the plate 29 at its side opposite the discharge line 2 are valve seats 34 with which valve members 35 are adapted to cooperate for controlling the flow of fluid through the ports 33. A guard member 36 is attached, as by bolts 37, to the plate 29, and springs 38 act between the guard member and the valve members 35 for urging the latter toward the seats 34.

Extending through the flange portions 14 are passages 40 and 41 which are connected respectively by conduits 42 and 43 under the control of manually operated valves 44 and 45 with a drain pipe 46 which is controlled by a manually operated valve 47.

Air discharged from the line 2 to the chamber 26 expands somewhat in the latter and is then broken up into several streams as it flows through the ports 33 and past the valve members 35 to the fluid delivery line 23. The chamber and the valve mechanism operate to remove pulsations in the fluid stream passing through the discharge line. The control device is intended for use in lines where the flow of fluid is continuous during the operation of the compressor and, because of the continued fluid flow, the chamber 26 may be of small volume and still be effective in removing pulsations. The extensible walls 17 provide for the variations in lengths of the conduits 2 and 23 caused by changes in temperature, and also act to absorb a portion of the pulsations. When the compressor is shut down, the valve members 35 are quickly moved by the springs 38 into engagement with the valve seats 34 for preventing a backflow of fluid. As the air expands in the chamber 26 and is deflected in its flow through the valve mechanism, water and oil carried by the air is separated from the latter and drops to the bottom of the chamber 26 where it may be drained at will through the passages 40, 41, conduits 42, 43, and the drain pipe 46.

As a result of my invention there is provided an improved compact device that may be easily connected into a line conducting compressed fluid for removing pulsations in the fluid stream, controlling the flow of fluid, removing water and oil, and providing for the expansion of the connections.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. The combination with a pump or compressor having a horizontal discharge line, of a flow control device connected in said horizontal discharge line for eliminating pulsations and for reducing hammering due to vibrations, comprising a casing coaxial with the discharge line and having end connections attached to aligned sections of the discharge line and formed with a chamber of substantially greater cross sectional area than the cross sectional area of the discharge line and through which the fluid flows, and a valve mechanism arranged in said chamber and including a valve member secured to said casing and dividing said chamber into an inlet side and a discharge side with which the discharge line connections respectively have communication, said valve member having a plurality of ports through which fluid flows while passing from said inlet side of said chamber to the discharge side thereof and automatic valves cooperating with said ports and permitting such fluid flow from the inlet side to the discharge side but automatically preventing fluid flow in the opposite direction toward the pump or compressor, said chamber being arranged with respect to the discharge line with its bottom substantially below the bottom of said discharge line to provide a liquid collecting sump, the fluid as it expands in said chamber and flows through said valve mechanism past said valves and through said ports having turbulence created therein, thereby causing any liquid entrained with the fluid to separate from the fluid and to accumulate on the surfaces of said valve mechanism and the separated liquid flowing by gravity into the sump.

2. The combination with a pump or compressor having a horizontal discharge line, of a flow control device connected in said horizontal discharge line for eliminating pulsations and for reducing hammering due to vibrations, comprising a casing coaxial with the discharge line and having end connections attached to aligned sections of the discharge line and formed with a chamber of substantially greater cross sectional area than the cross sectional area of the discharge line and through which the fluid flows, a valve mechanism arranged in said chamber and including a valve member secured to said casing and dividing said chamber into an inlet side and a discharge side with which the discharge line connections respectively have communication, said valve member having a plurality of ports through which fluid flows while passing from said inlet side of said chamber to the discharge side thereof and automatic valves cooperating with said ports and permitting such fluid flow from the inlet side to the discharge side but automatically preventing fluid flow in the opposite direction toward the pump or compressor, said chamber being arranged with respect to the discharge line with its bottom substantially below the bottom of said discharge line to provide a liquid collecting sump, the fluid as it expands in said chamber and flows through said valve mechanism past said valves and through said ports having turbulence created therein, thereby causing any liquid entrained with the fluid to separate from the fluid and to accumulate on the surfaces of said valve mechanism and the separated liquid flowing by gravity into the sump, and drainage means for said chamber including a valve controlled drain passage leading from the sump for draining liquid therefrom.

3. The combination with a pump or compressor having a horizontal discharge line, of a flow control device connected in said horizontal discharge line for eliminating pulsations, for reducing hammering due to vibrations and for compensating for pipe line expansion and contraction, comprising a casing coaxial with the discharge line and having expansible end walls providing end connections attached to aligned sections of the discharge line whereby said expansible end walls provide an expansion joint between the line sections to permit expansion and contraction of the discharge line due to temperature changes, said casing being formed with a chamber of substantially greater cross sectional area than the cross sectional area of the discharge line and through which the fluid flows, and a valve mechanism arranged in said chamber and including a valve member secured to said casing and dividing said chamber into an inlet side and a discharge side with which the discharge line connections respectively have communication, said valve member having a plurality of ports through which fluid flows while passing from said inlet side of said chamber to the discharge side thereof and automatic valves cooperating with said ports and permitting such fluid flow from the inlet side to the discharge side but automatically preventing fluid flow in the opposite direction toward the pump or compressor, said chamber being arranged with respect to the discharge line with its bottom substantially below the bottom of said discharge line to provide a liquid collecting sump, the fluid as it expands in said chamber and flows through said valve mechanism past said valves and through said ports having turbulence created therein, thereby causing any liquid entrained with the fluid to separate from the fluid and to accumulate on the surfaces of said valve mechanism and the separated liquid flowing by gravity into the sump.

4. The combination with a pump or compressor having a horizontal discharge line, of a flow control device connected in said horizontal discharge line for eliminating pulsations and for reducing hammering due to vibrations, comprising a casing coaxial with the discharge line and having end connections attached to aligned sections of the discharge line and formed with a chamber of substantially greater cross sectional area than the cross sectional area of the discharge line and through which the fluid flows, a valve mechanism arranged in said chamber and including a valve member secured to said casing and dividing said chamber into an inlet side and a discharge side with which the discharge line connections respectively have communication, said valve member having a plurality of ports through which fluid flows while passing from said inlet side of said chamber to the discharge side thereof and automatic valves cooperating with said ports and permitting such fluid flow from the inlet side to the discharge side but automatically preventing fluid flow in the opposite direction toward the pump or compressor, said chamber being arranged with respect to the discharge line with its bottom substantially below the bottom of said discharge line to provide a liquid collecting sump, the fluid as it expands in said chamber and flows through said valve mechanism past said valves and through said ports having turbulence created therein, thereby causing any liquid entrained with the fluid to separate from the fluid and to accumulate on the surfaces of said valve mechanism and the separated liquid flowing by gravity into the sump, and drainage means for said chamber including valve controlled drain passages, one leading from the sump at the inlet side and the other leading from the sump at the discharge side whereby said sides may be selectively drained.

5. The combination with a pump or compressor having a horizontal discharge line, of a flow control device connected in said horizontal discharge line for eliminating pulsations and for reducing hammering due to vibrations, comprising a casing coaxial with the discharge line and having end connections attached to aligned sections of the discharge line and formed with a chamber of substantially greater cross sectional area than the cross sectional area of the discharge line and through which the fluid flows, and a valve mechanism arranged in said chamber and including a valve member secured to said casing and dividing said chamber into an inlet side and a discharge side with which the discharge line connections respectively have communication, said valve member having a plurality of ports through which fluid flows while passing from said inlet side of said chamber to the discharge side thereof and automatic valves cooperating with said ports and permitting such fluid flow from the inlet side to the discharge side but automatically preventing fluid flow in the opposite direction toward the pump or compressor, said chamber being of sufficient volumetric capacity to cause substantial fluid expansion and said ports of said valve mechanism dividing the fluid in the discharge line into separate streams so that pulsations in the discharge line are substantially absorbed as the fluid flows through said chamber.

ALEXANDER D. FERGUSON.

REFERENCES CITED

The following references are of record in the file of this patent:

UNITED STATES PATENTS

| Number | Name | Date |
|---|---|---|
| 599,099 | Hibbard | Feb. 15, 1898 |
| 908,240 | Gelser | Dec. 29, 1908 |
| 963,463 | Mueller | July 5, 1910 |
| 1,297,296 | Jackson | Mar. 11, 1919 |
| 1,945,760 | Stroup | Feb. 6, 1943 |
| 2,318,964 | Parker | May 11, 1943 |

FOREIGN PATENTS

| Number | Country | Date |
|---|---|---|
| 515,095 | Great Britain | Nov. 27, 1939 |
| 617,376 | Holland | Aug. 17, 1935 |